United States Patent [19]

Kojima et al.

[11] Patent Number: 5,094,997
[45] Date of Patent: Mar. 10, 1992

[54] POROUS SUPPORT

[75] Inventors: Akikazu Kojima, Gamagori; Mitsuo Inagaki, Okazaki; Sigeru Kamiya, Aichi, all of Japan

[73] Assignee: Nippon Soken, Inc., Nishio, Japan

[21] Appl. No.: 552,316

[22] Filed: Jul. 13, 1990

[30] Foreign Application Priority Data

Jul. 26, 1989 [JP] Japan .................................. 1-193517

[51] Int. Cl.$^5$ .......................... B01J 32/00; B01J 35/04
[52] U.S. Cl. ..................................... 502/439; 502/527
[58] Field of Search ................................ 502/439, 527

[56] References Cited

U.S. PATENT DOCUMENTS

| 4,665,051 | 5/1987 | Nonnenmann | 502/527 X |
| 4,818,746 | 4/1989 | Cyron | 502/527 |
| 4,847,230 | 7/1989 | Cyron | 502/527 X |
| 4,923,109 | 5/1990 | Cyron | 502/527 X |

FOREIGN PATENT DOCUMENTS 60-244318 12/1985 Japan .
63-274456 11/1988 Japan .
63-278554 11/1988 Japan .
2-106334  4/1990 Japan .

Primary Examiner—W. J. Shine
Attorney, Agent, or Firm—Cushman, Darby & Cushman

[57] ABSTRACT

A porous support of the present invention comprises a laminate which is formed by laminating a corrugated sheet, in which high and low wave portions coexist, and a flat sheet, and which is wound into a spiral form. The porous support is particularly used as a catalyst support for purifying automobile exhaust gas. Appropriate combination of the high and the low wave portions in the corrugated sheet permits the selection of any one of various cross-sectional forms such as a conventional circular form, a race track-like form, a broad bean-like form, a triangular form and other suitable forms. The degree of freedom of the form can be thus increased.

9 Claims, 10 Drawing Sheets

POROUS SUPPORT

BACKGROUND OF THE INVENTION

1. Field of the Invention

The present invention relates to a porous support, and particularly to a porous support which is used as a catalyst support for purifying automobile exhaust gas or the like.

2. Description of the Prior Art

Conventional metal catalyst supports for purifying automobile exhaust gas are disclosed in, for example, Japanese Patent Unexamined Publication Nos. 55-99323, 63-274456 and 63-27854 in which a heat-resistant flat metal sheet and a heat-resistant corrugated metal sheet are laminated and wound.

However, the cross-sectional forms of the conventional supports are limited to circular and race track-like forms owing to the roll structure.

The conventional supports thus have no degree of freedom of the forms.

SUMMARY OF THE INVENTION

The present invention has been achieved with a view to solving the above problem, and it is an object of the present invention to provide not only circular and race track-like forms and but also other forms as the cross-sectional form of a support.

To this end, the present invention provides a porous support comprising a laminate which is formed by laminating a flat sheet and a corrugated sheet and which is wound into a spiral form, both high and low wave portions coexisting in the corrugated sheet at least in the peripheral region of the support.

The arrangement, in which both high and low wave portions coexist in the corrugated sheet, permits the form surrounded by the line which connects the peaks of the high wave portions and of the low wave portions to be arbitrarily designed by appropriately selecting the combination of the high and the low wave portions.

The combination of the corrugated sheet and the flat sheet thus permits the cross-sectional form of the support to be arbitrarily selected.

The present invention exhibits an excellent practical effect in that various forms can be selected as the cross-sectional form of a porous support comprising a laminate of a flat sheet and a corrugated sheet, which is wound, thereby increasing the degree of freedom.

DESCRIPTION OF THE PREFERRED EMBODIMENTS

Figure 1:
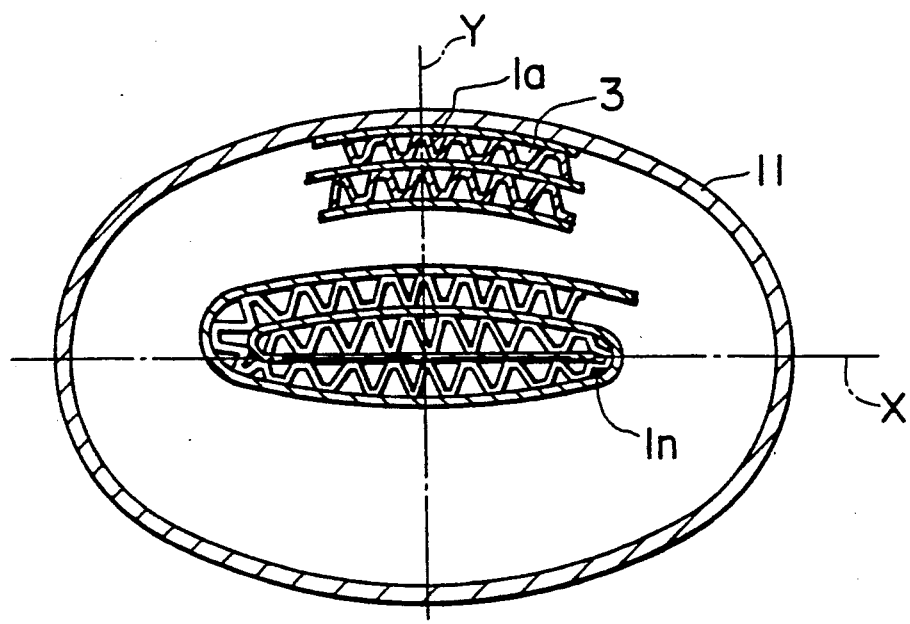
FIG. 1 is a cross-sectional view of a first embodiment of the present invention.
Figure 2:
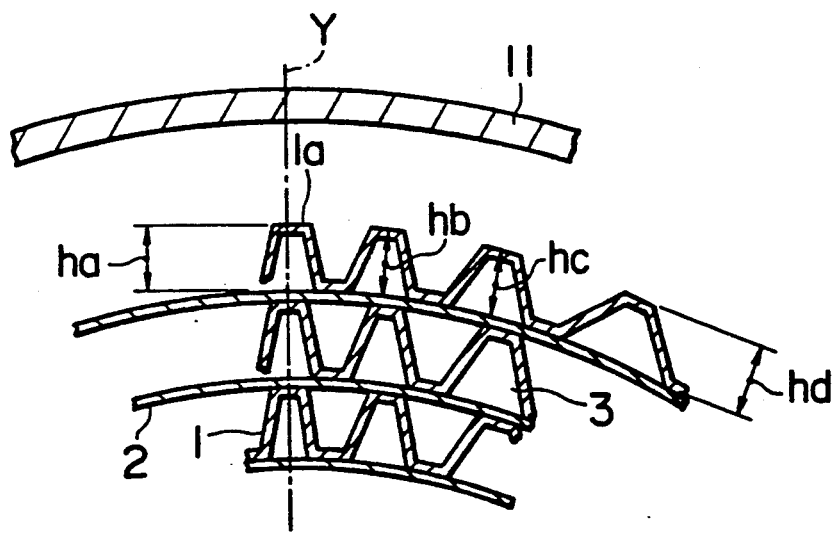
FIG. 2 is an enlarged sectional view of the peripheral region in a portion on the Y axis shown in FIG. 1.
Figure 3:
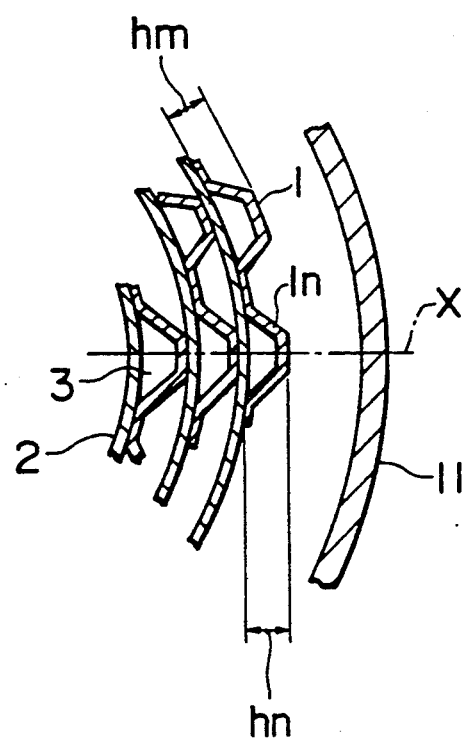
FIG. 3 is an enlarged sectional view of the peripheral region in a portion on the X axis shown in FIG. 1.
Figure 4:
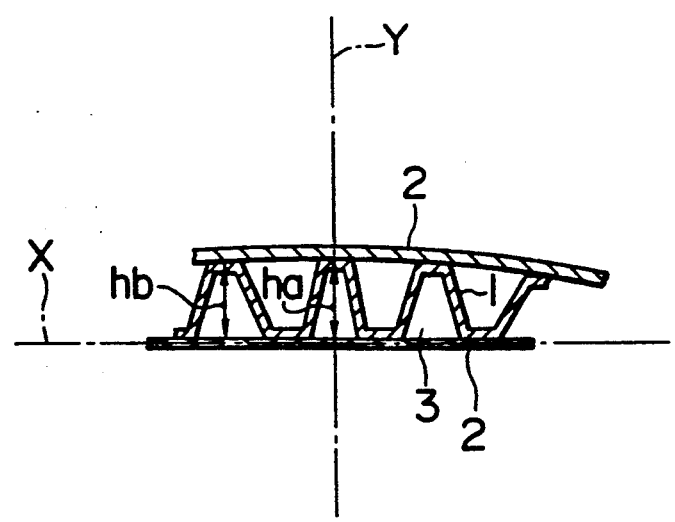
FIG. 4 is an enlarged sectional view of the central region of the support where the X axis and the Y axis cross each other.
Figure 5:
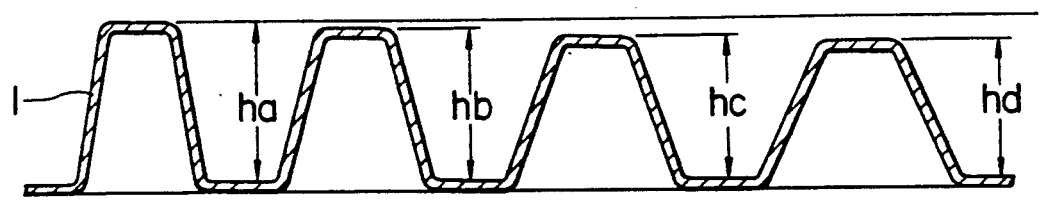
FIG. 5 is a sectional view which shows a height relation of the corrugated sheet shown in FIG. 1.
Figure 6:
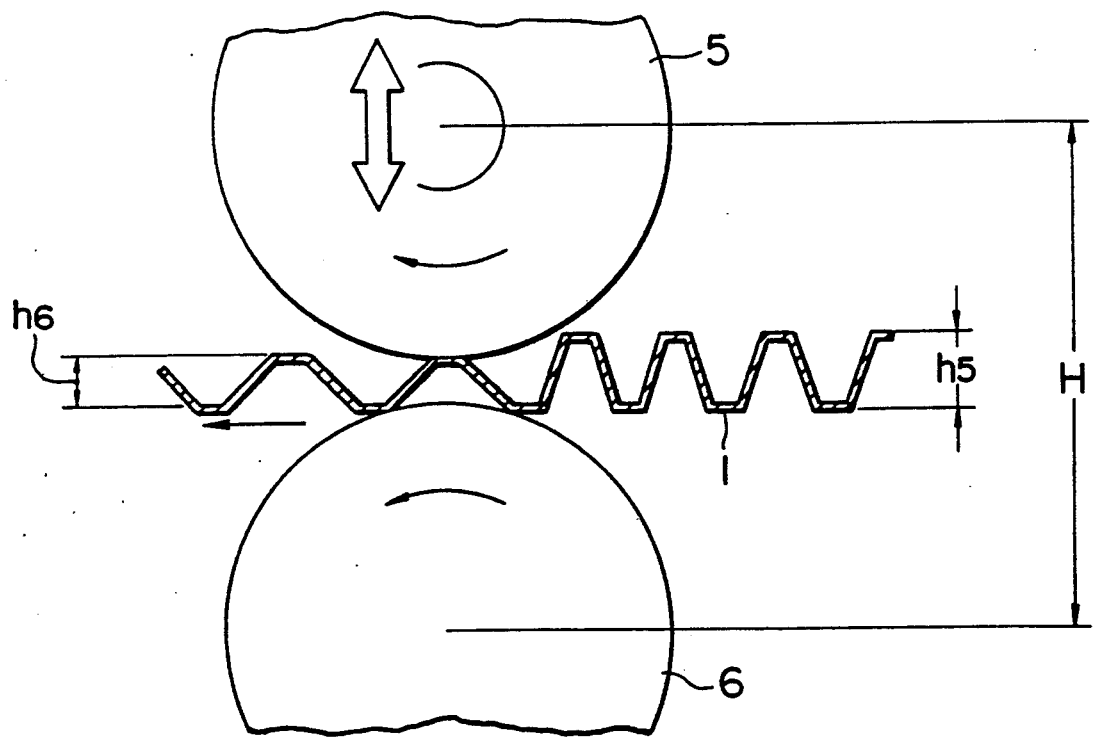
FIG. 6 is a schematic diagram which shows an example of a method of producing the corrugated sheet having portions with different heights shown in FIG. 1.

The present invention is described below on the basis of embodiments in which the present invention is applied to catalyst supports for purifying automobile exhaust gas. In the first embodiment shown in FIGS. 1 to 5, reference numeral 1 denotes a heat-resistant corrugated metal sheet, and reference numeral 2 denotes a heat-resistant flat sheet. Both sheets 1, 2 are laminated and wound, while being bonded to each other by using a brazing filler metal (not shown) to form a cylindrical catalyst support having an elliptical cross sectional form. Air holes 3 are formed between the corrugated sheet 1 and the flat sheet 2 so as to pass through the catalyst support in the axial direction thereof and open at both ends of the catalyst support.

In the corrugated sheet 1, the height $h_a$ of a wave portion $l_a$ on the Y axis in the minor axis direction of the elliptical cross-sectional form of the catalyst support, and the height $h_n$ of a wave portion $l_n$ on the X axis in the major axis direction, have the relationship, $h_a > h_n$, and the wave heights $h_b, h_c, h_d, \ldots$ between the wave portions $l_a$ and $l_n$ are continuously changed (continuously decreased from the wave portion $l_a$ to the wave portion $l_n$).

The heights of all the wave portions $l_a$ on the Y axis in the minor axis direction are the same in the minor axis direction, and the heights of all the wave portions $l_n$ on the X axis in the major axis direction are the same in the major axis direction.

An oxidation-reduction catalyst (not shown) for purifying exhaust gas is supported in the portions of the corrugated sheet 1 and the flat sheet 2 corresponding to the air holes 3.

Figure 22:
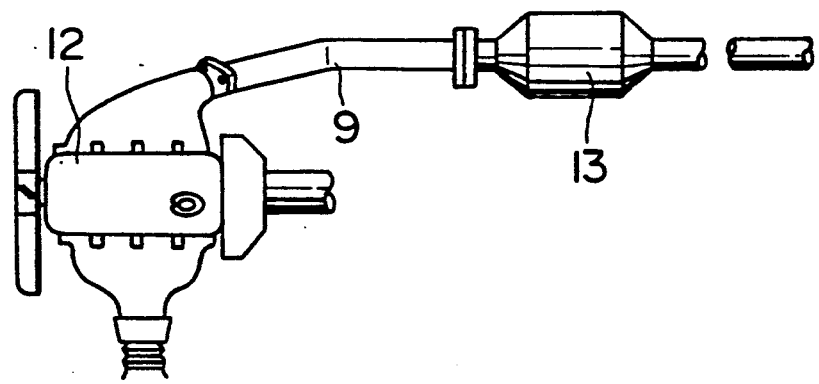
FIG. 22 is a schematic drawing which shows an example of an apparatus for purifying automobile exhaust gas to which the present invention is applied.

A catalyst converter provided with the catalyst support is installed in an intermediate position of an exhaust pipe 9 of an internal combustion engine 12, as shown in FIG. 22. The harmful components of automobile exhaust gas are therefore removed by the catalyst during the passage of the exhaust gas through the air holes in the catalyst converter 13.

A description will now be given of an example of the method of producing the catalyst support having the above structure. In FIGS. 6 to 9, the corrugated plate 1, which is previously formed so as to have a wave height of $h_5$, is passed between two rollers 5, 6, whose shafts are at a distance H (a distance between the rollers) which ca be variably controlled by using hydraulic pressure or the like. Namely, the distance H between the shafts of the rollers 5, 6 is controlled so that the wave height is $h_n$ when the portions, which are wound on the X axis in the major axis direction shown in FIG. 1, are passed through the rollers 5, 6, and the wave height is $h_a$ when the portions, which are wound on the Y axis in the minor axis direction shown in FIG. 1, are passed through the rollers 5, 6. On the other hand, the distance H between the shafts of the rollers 5, 6 is controlled so as to continuously change when the portions between the X axis in the major axis direction and the Y axis in the minor axis direction are passed through the rollers 5, 6.

Figure 7A:
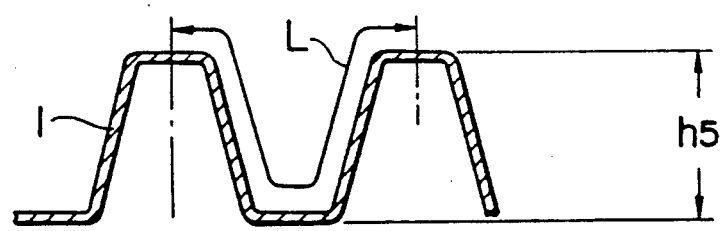
FIGS. 7A and 7B are sectional views which show the forms of the corrugated sheet before and after the production using the method shown in FIG. 6, respectively.
Figure 7B:
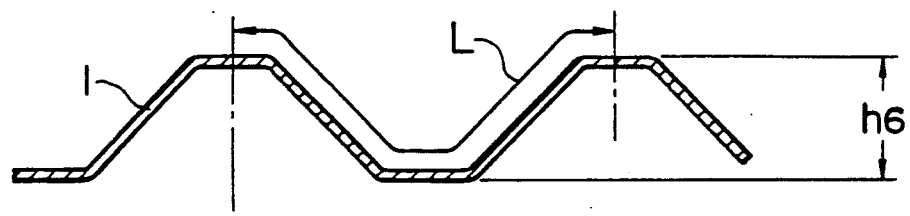

In this way, the initial wave height of $h_5$ of the corrugated sheet 1 is changed to a wave height of $h_6$. In this method, since the corrugated sheet 1 is pressed by the rollers 5, 6, the length L between the peaks of the adjacent waves is the same before and after being pressed, as shown in FIGS. 7A and 7B.

Figure 8:
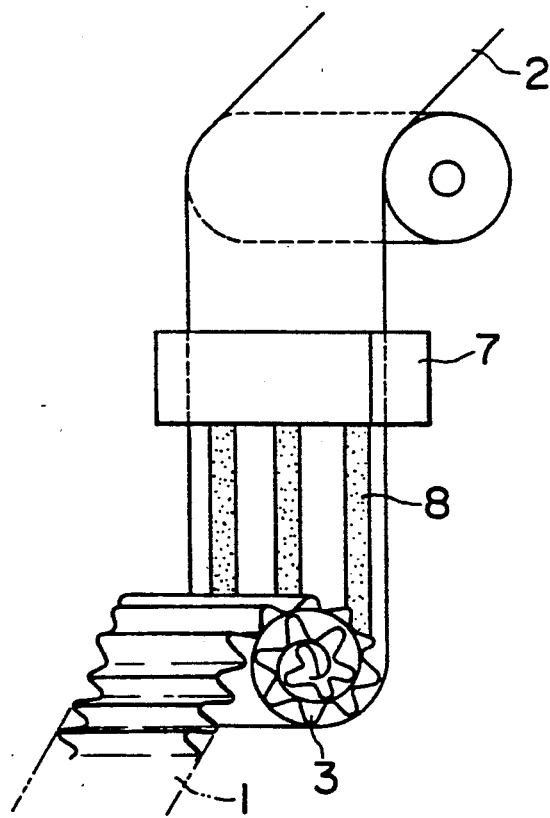
FIG. 8 is a schematic perspective view which shows an example of a method of laminating the corrugated sheet formed by the method shown in FIG. 6 and a flat sheet and winding the two sheets.
Figure 9:
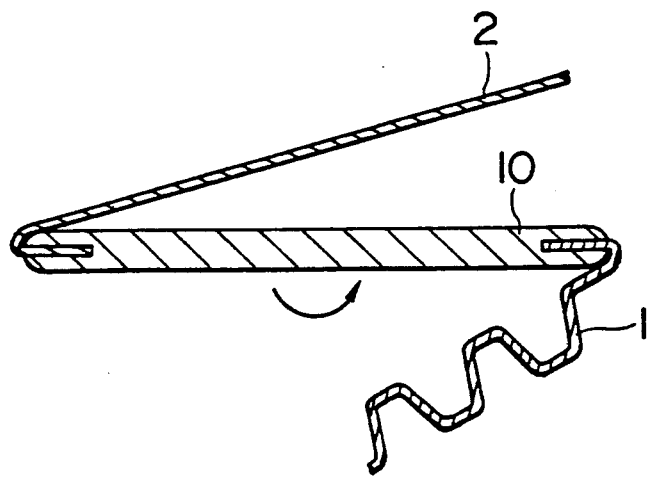
FIG. 9 is a sectional view which shows a relation between the core, the corrugated sheet and the flat sheet, which are used in the production method shown in FIG. 8.
Figure 10:
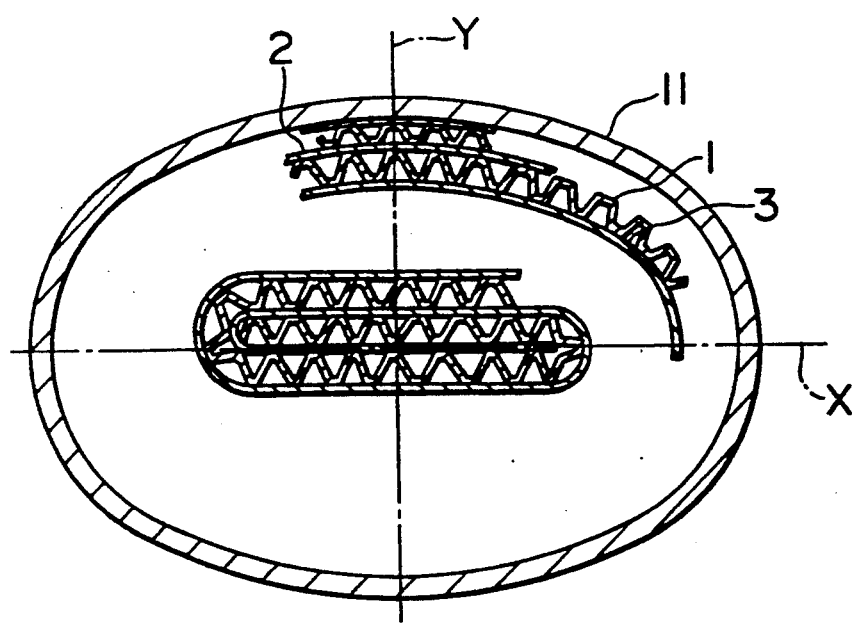
FIG. 10 is a cross-sectional view of a second embodiment of the present invention.
Figure 11:
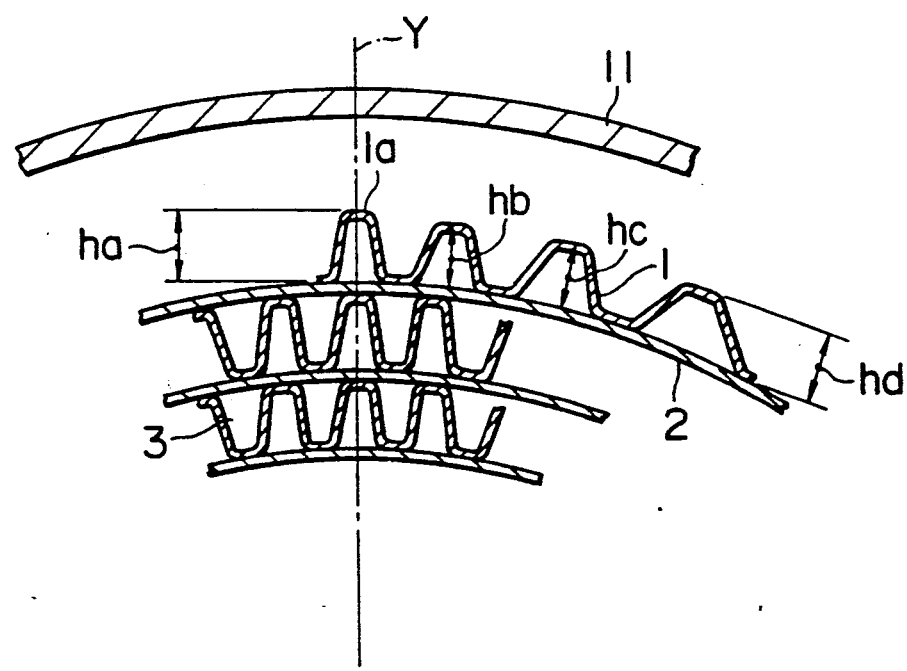
FIG. 11 is an enlarged sectional view of the peripheral region in a portion on the Y axis shown in FIG. 10.
Figure 12:
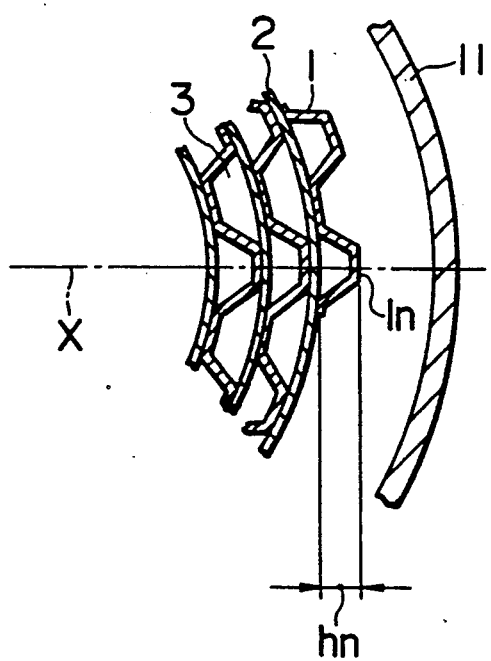
FIG. 12 is an enlarged sectional view of the peripheral region in a portion on the X axis shown in FIG. 10.

The corrugated sheet 1, in which the wave height is adjusted in the above-described manner, is combined with the flat sheet 2 and wound, while brazing filler metal 8 being applied to three portions on the surface of the flat sheet 2 from a brazing filler metal applying apparatus 7, as shown in FIG. 8. When the winding of the two sheets is started, the front ends of the two sheets are respectively inserted into both ends of a core plate 10, as shown in FIG. 9, and then wound on the core plate 10. After winding, the core plate 10 is removed, and the product is inserted into a cylindrical container 11 as shown in FIG. 1 and then transferred to a vacuum furnace. In the vacuum furnace, the corrugated sheet 1 and the flat sheet 2 are bonded by brazing, as well as the flat sheet 2 is bonded to the container 11 in the outermost peripheral region, to form a catalyst converter.

Since high and low wave portions coexist in the corrugated sheet 1, as described above, it is possible to obtain a cross-sectional form surrounded by the line which connects the peaks of the high and the low wave portions. In this embodiment, an elliptical cross-sectional form is obtained.

The second embodiment of the present invention shown in FIGS. 10 to 13 is described below.

Figure 13:
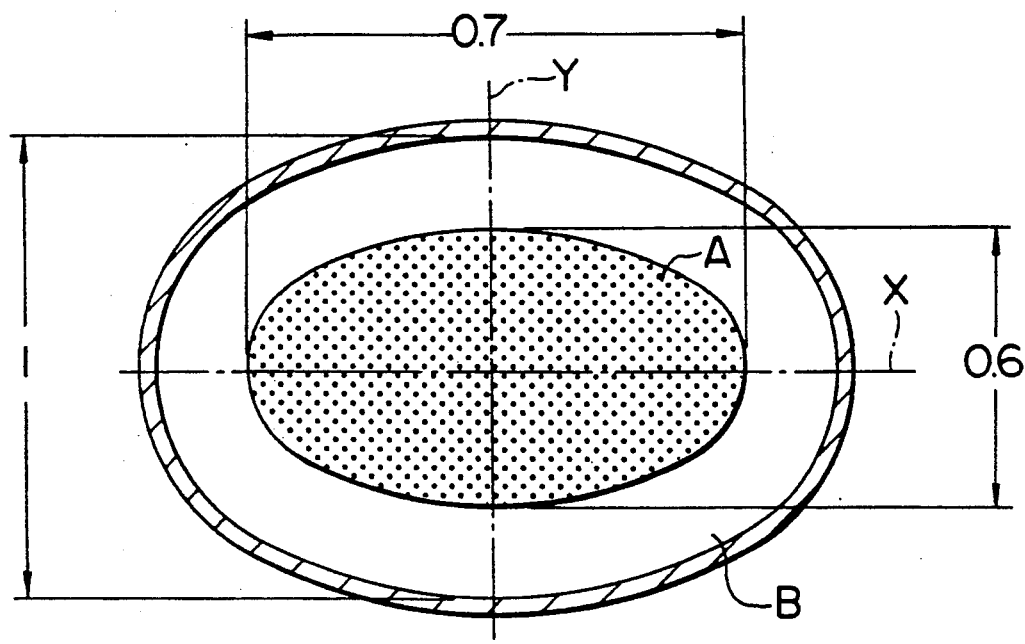
FIG. 13 is an explanatory view provided for explaining a relation between regions having different wave heights in the corrugated sheet shown in FIG. 10.
Figure 14:
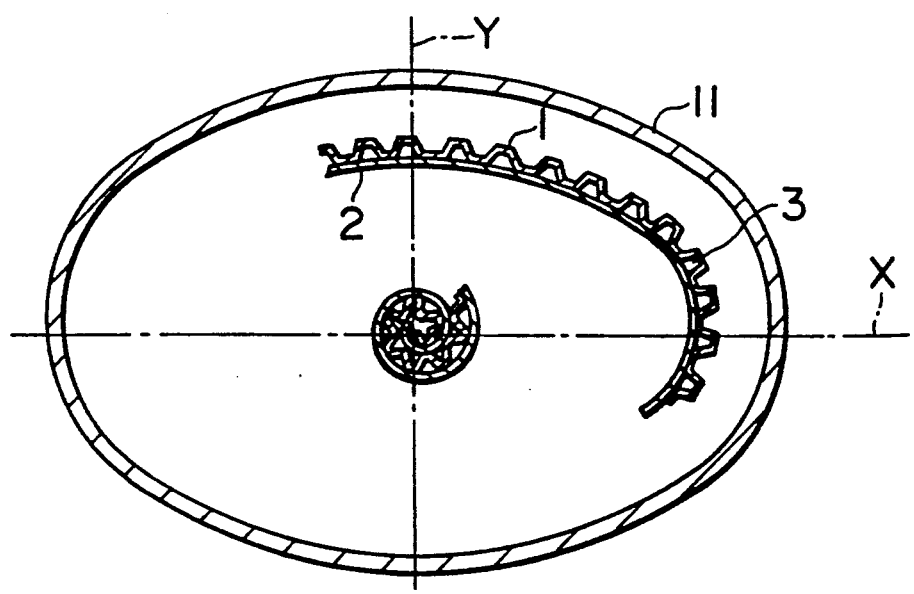
FIG. 14 is a cross-sectional view of a third embodiment of the present invention.
Figure 15:
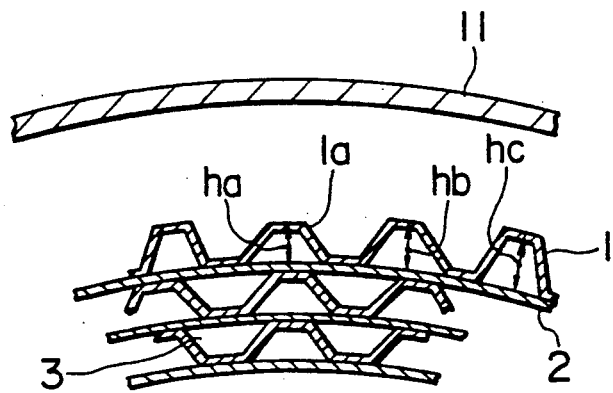
FIG. 15 is an enlarged sectional view of the peripheral region in a portion on the Y axis shown in FIG. 14.
Figure 16:
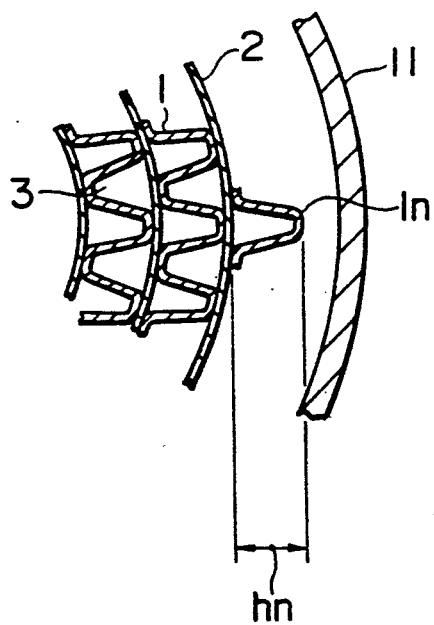
FIG. 16 is an enlarged sectional view of the peripheral region in a portion on the X axis shown in FIG. 14.
Figure 17:
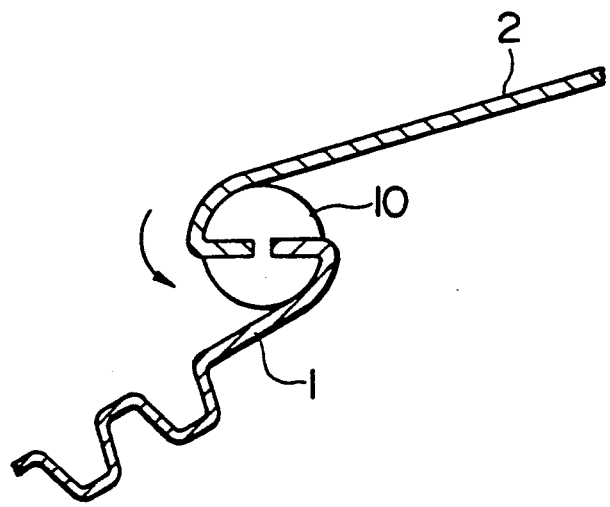
FIG. 17 is a sectional view which shows a relation between the core, the corrugated sheet and the flat sheet, all of which are used in the method of producing a catalyst support shown in FIG. 14.

A corrugated sheet 1 has a constant wave height in a central region A, which has a length ratio of 0.6 in the minor axis direction and a length ratio of 0.7 in the major axis direction relative to the length of 1 in the minor axis direction of the catalyst support, while it has different wave heights in a peripheral region B, as shown in FIG. 13. Namely, the wave height $h_a$ of a wave portion $l_a$ on the Y axis in the minor axis direction of the elliptical cross-sectional form and the wave height $h_n$ of a wave portion $l_n$ on the X axis in the major axis direction have the relation, $h_a > h_n$. Further, the wave heights $h_b, h_c, h_d, \ldots$ between the wave portions $l_a$ and $l_n$ are continuously changed (continuously decreased from the wave portion $l_a$ toward the wave portion $l_n$).

The wave heights of all the wave portions $l_a$ on the Y axis in the minor axis direction are the same in the minor axis direction, and the heights of all the wave portions $l_n$ on the X axis in the major axis direction are the same in the major axis direction.

The use of the corrugated sheet 1 having the above-described height relation permits the formation of a catalyst support having an elliptical cross-sectional form.

FIGS. 14 to 17 show a third embodiment of the present invention in which the height relation is reverse to that of the second embodiment. The third embodiment is the same as the second embodiment in the point that the catalyst support has a central region A and a peripheral region B having different wave heights. However, in the peripheral region B, the wave height $h_a$ of a wave portion $l_a$ on the Y axis in the minor axis direction of the elliptical cross-sectional form and the wave height $h_n$ of a wave portion $l_n$ on the X axis in the major axis direction have the relation, $h_a < h_n$, and the $l_a$ and $l_n$ are continuously changed (continuously increased from the wave portion $l_a$ toward the wave portion $l_n$) (the relation reverse to the first embodiment). In this embodiment, when the catalyst support is produced, the front ends of the corrugated sheet 1 and the flat sheet 2 are wound on a cylindrical core 10.

The wave heights of all the wave portions $l_a$ on the Y axis in the minor axis direction are the same in the minor axis direction, and the heights of all the wave portions $l_n$ on the X axis in the major axis direction are the same in the major axis direction.

Figure 18:
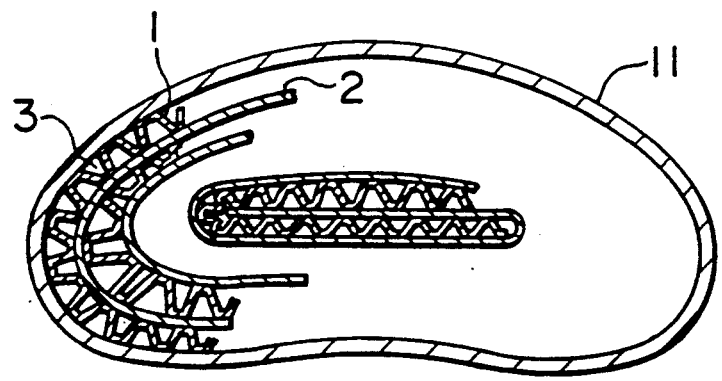
FIG. 18 is a cross-sectional view of a fourth embodiment of the present invention.
Figure 19:
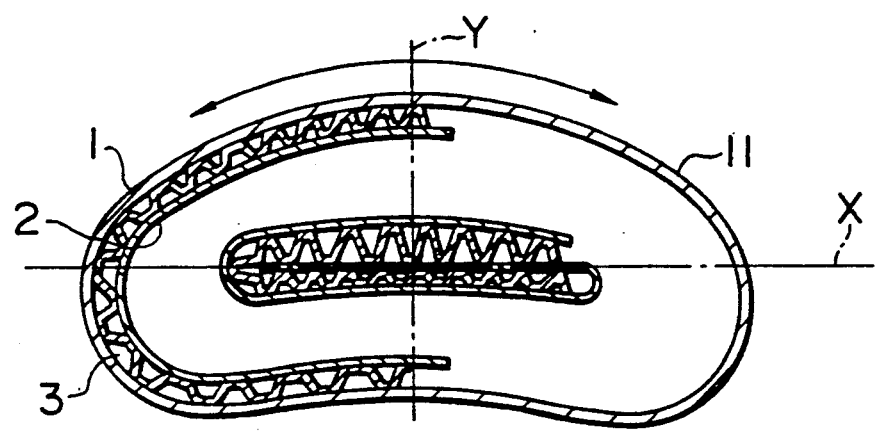
FIG. 19 is a sectional view provided for explaining a height relation of the corrugated sheet of the fourth embodiment.

FIGS. 18 and 19 show a fourth embodiment of the present invention. As shown in FIG. 19, the wave potions on the Y axis in the minor axis direction have the greatest height, and the wave heights are continuously decreased in the direction shown by the arrow in the drawing. The wave heights of all the wave portions on the Y axis in the minor axis direction are the same in the minor axis direction.

In this embodiment having above structure, the catalyst support has a board bean-like cross-sectional form, as shown in FIG. 18.

Figure 20:
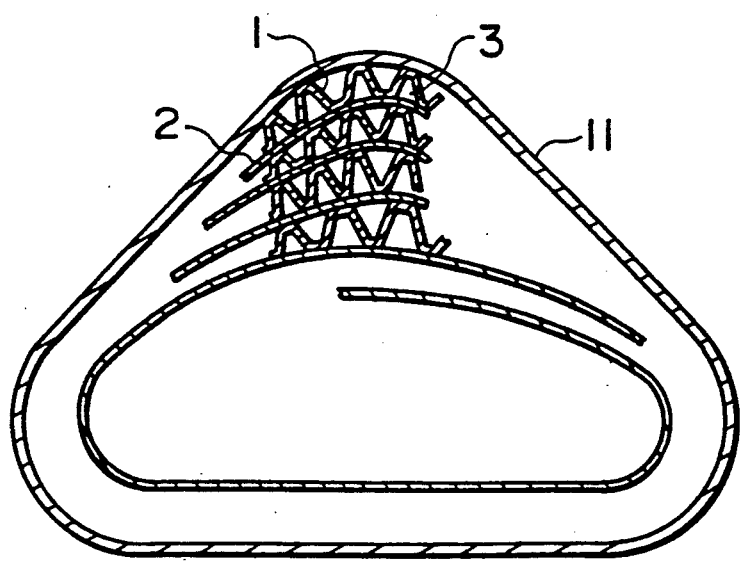
FIG. 20 is a cross-sectional view of a fifth embodiment of the present invention.
Figure 21:
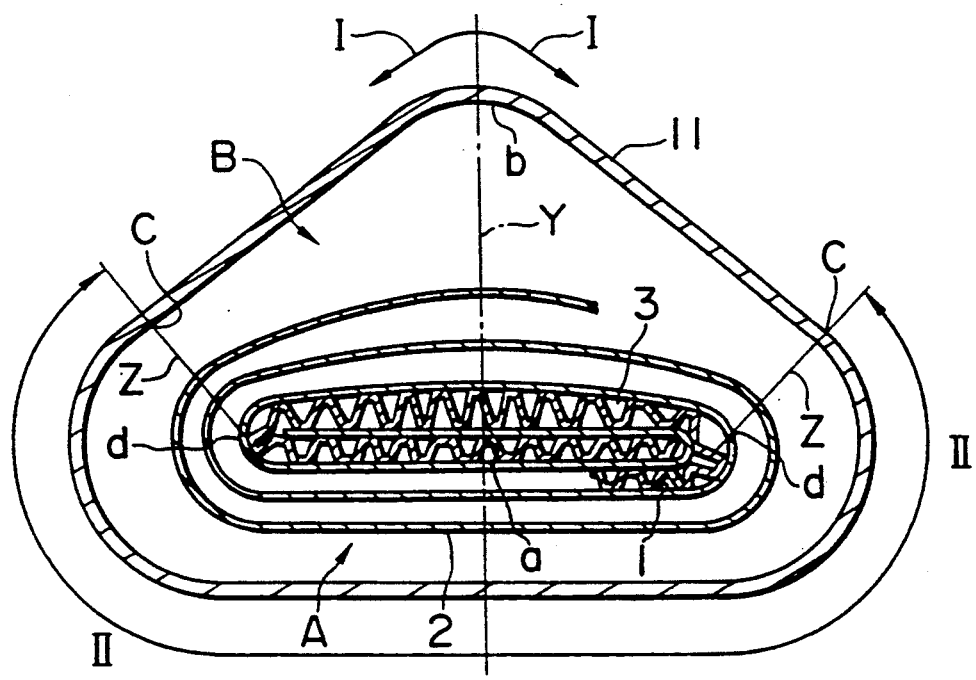
FIG. 21 is a sectional view provided for explaining a height relation of the corrugated sheet of the fifth embodiment.

FIGS. 20 and 21 show a fifth embodiment of the present invention. In this embodiment, as shown in FIG. 21, the wave portions on the line Y, which connects a point a at a height corresponding to about ¼ of the length in the minor axis direction and a point b, have the maximum height. The wave height is continuously decreased in the directions shown by the arrows I in FIG. 21 in a region B surrounded by the line connecting the points c where the periphery of the catalyst support is substantially halved, the points d where the lines Z normal to the points c and the sheet 1 cross each other, and the point a. In the other region A (refer to the arrow II in the drawing), the wave height is the same as the lowest height (in the portions on the line Z) in the region B.

In this embodiment configured as described above, the catalyst support has a substantially triangular cross-sectional form, as shown in FIG. 20.

The present invention is not limited to the above-described embodiments, and the invention can be changed in the manner described below.

(1) The combination pattern of high portions and low portions in the corrugated sheet is not limited to those in the above embodiments, and various combination patterns can be used. The use of various combination patterns permits the formation of porous supports having various cross-sectional forms such as circular, race track-like forms and the like.

(2) It is a matter of course that the form of the corrugated sheet is not limited to a sine wave, and it may be a rectangular wave or a triangular wave.

(3) The present invention can be applied to not only catalyst supports for purifying automobile exhaust gas but also catalyst supports for purifying exhaust gas in various fields. The present invention can be of course applied to filter members used in various fields by appropriately selecting the materials of the corrugated sheet and the flat sheet.

What is claimed is:

1. A porous support comprising a flat sheet, and a corrugated sheet formed into a wave shape, laminated to one another and wound into a spiral form with all crests of all said waves of said corrugated sheet being in contact with said flat sheet, wherein said corrugated sheet has varying wave height to be adapted for a desired cross-sectional form of said support at least in the peripheral region of said support.

2. A porous support according to claim 1, wherein said porous support has a substantially elliptical cross-sectional form, and, at least in the peripheral region of said support, the wave height of said corrugated sheet is maximum in portions on the minor axis of said elliptical form, and the minimum in portions on the major axis of said elliptical form, the maximum wave height being gradually decreased to the minimum wave height in the portion between said minor axis and said major axis.

3. A porous support according to claim 1, wherein said porous support has a substantially elliptical cross-sectional form, and, a least in the peripheral region of said support, the wave height of said corrugated sheet is minimum in portions on the minor axis of said elliptical form and maximum in the portion on the major axis of said elliptical form, the minimum wave height being gradually increased to the maximum wave height in the portion between said minor axis and said major axis.

4. A porous support according to claim 1, wherein said porous support has a substantially race track-like cross-sectional form.

5. A porous support according to claim 1, wherein said porous support has a broad bean-like cross sectional form.

6. A porous support according to claim 1, wherein said porous support has a substantial triangular cross-sectional form.

7. A porous support comprising a laminate which is formed by laminating a flat sheet and a corrugated sheet formed into a wave shape and having wave crests of all waves laminated to said flat sheet, and which is wound into a spiral form, wherein, at least in the peripheral region of said support, although a length between the peaks of the adjacent waves along said corrugated sheet is constant, distances between the respective peaks are different.

8. A porous support according to any one of claims 2 to 6, 7 or 1, wherein said porous support is sued as a catalyst support for purifying automobile exhaust gas.

9. A method of producing a porous support comprising the steps of passing a corrugated sheet, in which many waves having a constant wave height are continuously formed with a constant pitch, between two rollers while continuously changing a distance between the shafts of said rollers to form a corrugated sheet in which the wave height is continuously changed, applying a bond to the surface of a flat sheet and laminating said flat sheet and said corrugated sheet such that crests of all of said waves are laminated to said flat sheet, and winding the laminate of said both sheets into a spiral form.

* * * * *